(12) United States Patent
Roy et al.

(10) Patent No.: US 7,194,680 B1
(45) Date of Patent: Mar. 20, 2007

(54) FORMATTING CONTENT BY EXAMPLE

(75) Inventors: H. Scott Roy, San Jose, CA (US); Jeff Young, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 729 days.

(21) Appl. No.: 09/456,888

(22) Filed: Dec. 7, 1999

(51) Int. Cl.
*G06F 17/00* (2006.01)

(52) U.S. Cl. .................................. 715/513; 715/526

(58) Field of Classification Search ............... 715/513, 715/526; 345/700, 760, 764
See application file for complete search history.

(56) References Cited

U.S. PATENT DOCUMENTS

| | | | | |
|---|---|---|---|---|
| 4,674,040 A | | 6/1987 | Barker et al. ............... | 707/200 |
| 5,835,712 A | | 11/1998 | Dufresne ..................... | 709/203 |
| 5,845,084 A | * | 12/1998 | Cordell et al. .............. | 709/234 |
| 5,845,303 A | * | 12/1998 | Templeman ................. | 715/517 |
| 5,890,171 A | | 3/1999 | Blumer et al. ........... | 715/501.1 |
| 5,911,145 A | * | 6/1999 | Arora et al. ................. | 715/514 |
| 5,953,731 A | * | 9/1999 | Glaser ........................ | 715/513 |
| 5,956,736 A | * | 9/1999 | Hanson et al. .............. | 715/513 |
| 5,987,480 A | * | 11/1999 | Donohue et al. ........ | 715/501.1 |
| 6,021,426 A | * | 2/2000 | Douglis et al. ............. | 709/200 |
| 6,205,452 B1 | * | 3/2001 | Warmus et al. ............. | 715/500 |
| 6,230,173 B1 | * | 5/2001 | Ferrel et al. ................ | 715/513 |
| 6,343,302 B1 | * | 1/2002 | Graham .................... | 715/501.1 |
| 6,347,323 B1 | * | 2/2002 | Garber et al. ............... | 707/203 |
| 6,446,097 B1 | * | 9/2002 | Glaser ........................ | 715/513 |
| 6,558,431 B1 | * | 5/2003 | Lynch et al. ................ | 715/513 |
| 6,584,480 B1 | * | 6/2003 | Ferrel et al. ................ | 715/513 |

FOREIGN PATENT DOCUMENTS

WO 99 22313 A 5/1999

OTHER PUBLICATIONS

Microsoft Corporation, "Microsoft Access 97—A Beginners' Guide," http://www.rdg.ac.uk/ITS/Topic/Database/DaPAcc9701 (28 pages), Sep. 1999.

* cited by examiner

*Primary Examiner*—Sanjiv Shah
(74) *Attorney, Agent, or Firm*—Fish & Richardson P.C.

(57) ABSTRACT

A method generates a document by: inserting one or more placeholders in the document; binding each placeholder to a content source; and compiling the placeholders into code to generate content for the document based on the content source. The method then executes the code to generate the content and presenting the content of the document if in a presentation mode or restores the placeholder if in an edit mode.

40 Claims, 6 Drawing Sheets

FORMATTING CONTENT BY EXAMPLE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights.

BACKGROUND OF THE INVENTION

The invention relates to apparatus and process for generating content.

The Internet is becoming an increasingly popular medium for communicating and publishing widely accessible documents. A network of networks, the Internet transfers information using a common protocol that tells computers connected to the network how to locate and exchange files with one another. Documents communicated over the Internet generally conform to a Hyper Text Markup Language (HTML) that a World-Wide-Web (WWW or Web) browser can translate and display. Once posted on a Web server, these documents or compilations of pages can be retrieved and viewed by anyone who has access to the Internet.

Each document is essentially a collection of HTML codes or tags which provide the document with a general structure of a head and a body, as well as headings, format controls, forms, tables, and one or more element types. A basic familiarity with HTML codes is only one aspect in the process of creating HTML documents. Another issue relates to the process of editing such documents. Although a conventional text editor or word processor can be used to add HTML markups to the document, such method of composing and editing the HTML document is quite tedious as the process does not allow a designer to see the document as actually displayed by the browser. Without visual feedback, the process of composing and editing the HTML document can be error-prone and inefficient. Moreover, when the HTML document contains elements other than the usual text and text formatting codes, the process of composing and editing the HTML document can be challenging. For example, if the image elements were embedded in the document, the conventional text editor or word processor would reference each image using only its access path and file name. Consequently, the designer has to be more careful and more exact in selecting the elements, as the designer cannot visually verify that the correct image is being edited. Hence, the difficulty in generating the desired HTML document is increased when non-text elements are embedded in the document.

The difficulty is particularly accentuated for the development of web sites in which the content or interaction of the web site changes based on designer or environmental information. Examples of such sites include on-line catalogs, news sites, or e-commerce sites.

Typically, to support dynamic web sites, a web server called a dynamic content server processes pages to insert or replace content at run-time. Examples include Microsoft's Internet Information Server (IIS), which processes Active Server Pages (ASP).

Currently, web sites are generally authored in two steps:

(1) A designer creates the look and feel of the web site by creating a mock-up of the site in Photoshop.

(2) The Photoshop image is then handed to programmers who hand-code the web pages in HTML and script code to be executed by a content server.

This two-step process is caused by the fact that WYSIWYG HTML editors are insufficiently expressive to show what the designer wants, and; that existing content specification systems generally imbed processing instructions directly within the HTML, making it hard for them to co-exist with WYSIWYG HTML editors. An example of these processing instructions is exemplified by the following Active Server Page (ASP) code

```
<BODY>
<%
set patents = CreateObject("ADODB.RecordSet")
patents.Open "myPatentDatabase"
%>
<TABLE>
    <TR>
        <TH>Title</TH>
        <TH>Description</TH>
</TR>
<% while not patents.EOF %>
    <TR>
        <TD><%=patents("PATENT_TITLE")%></TD>
        <TD><%=patents("SHORT_DESCRIPTION")%></TD>
    </TR>
    <% patents.MoveNext %>
```

This two-step process is inefficient since the page is in effect designed twice: once in Photoshop, and once in HTML file. Moreover, the designer cannot go back and make changes to the HTML file, because the ASP code cannot be easily read back into a WYSIWYG editor since ASP is a language-independent framework designed by Microsoft for efficient coding of server-side scripts that are executed by a Web server in response to a user's request for a URL. ASP scripts are similar to other server-side scripting such as Perl and Python. Not surprisingly, although many people can design web pages, only a few designers can compose web sites with ease.

SUMMARY OF THE INVENTION

The system and techniques specify content insertions based on elements, each with a representative content. The format, style, and layout of the representative content of the elements is used to format, style, and layout the content.

A method generates a document by: inserting one or more placeholders in the document; binding each placeholder to a content source; and compiling the placeholders into code to generate content for the document based on the content source. The method then executes the code to generate the content and presenting the content of the document if in a presentation mode or restores the placeholder if in an edit mode.

Implementations of the invention may include one or more of the following. The placeholders can be formatted and annotated. Executable code can then be generated from the annotations to retrieve the content. The document can then be rendered based on the content. The generating of executable codes can include generating code to obtain content from a database. The code can be embedded as attributes in the placeholder. The placeholder can be a mark-up element, and can be an HTML element or an XML element. The method can include specifying a content insertion based on the placeholder, each placeholder having a representative content. The method can also use the formatting, styling, or layout of the representative content of the placeholder to format, style, or layout the content.

In another aspect, a method generates a document by inserting one or more placeholders in the document; binding each placeholder to a content source; and interpreting the placeholders and presenting the content of the document if in a presentation mode or restoring the placeholder if in an edit mode.

Implementations of the invention may include one or more of the following. Each placeholder includes one or more annotations describing the content for the placeholder. These annotations are used to generate content to replace the placeholder. The content as interpreted by the annotations are retrieved from the content sources. Each placeholder can be formatted. The formatting the content can be adjusted to match the format of the placeholder. The method can also interpret the layout; and replace the content in lieu of the placeholder when rendering the document. The placeholder can be restored when the designer edits the page in an edit mode. Metadata for the placeholder can be stored as a comment field in the document.

In another aspect, a method applies a document by: inserting one or more mark-up elements in the document; binding the mark-up elements to one or more content sources; retrieving data from the bound one or more content sources and replacing the mark-up elements with the retrieved data during run-time; and restoring the mark-up elements during an edit session.

Implementation of this method can include updating a markup language document during run-time based on an original layout and content generated on-the-fly. Further, the content replaces the placeholder.

In another aspect, a method generates a document having one or more mark-up elements, each elements being bound to a content source. This is done by specifying one or more parameters; retrieving data satisfying the one or more parameters from the bound content source; replacing the mark-up elements with the retrieved data; and displaying the document.

Advantages of the system may include one or more of the following. A designer can use a WYSIWYG editor to create a web site design in HTML. The system then uses the format, layout, and style of the HTML to insert, format, layout, and style the content. Because the system uses HTML, any HTML tool can be used to refine or edit the design.

The system supports a designer-friendly approach to incorporating the content technology of ASPs in a Web site. Powerful features for Web site designers, programmers, and intranet or e-commerce developers are supported, including the ability to work on or off line; add content sources to a page without writing a single line of script code; highlight placeholder text and graphics linked to content; customize numeric formatting and replication of table rows; links to pages; preview pages using placeholder or actual content; and generate all HTML and ASP code necessary for automatic content generation.

The system makes it easy to integrate content into a Web site. A web designer may create a web page using a conventional markup language and bind one of many database type fields to a portion of the markup language. Furthermore, the designer may replace the binding at a later time to another independent database to the same markup language portion. The two databases themselves may not be compatible to each other.

The Web designer can have complete pixel-level control over HTML in a visual design environment, while automatically generating industry-compliant ASP or other server code. The designers can see exactly how their designs look on different platforms and browsers in an Edit mode. Moreover, the system provides management tools to make it easier to create and maintain Web sites. Furthermore, as the content of the database fields that are bound to a portion of the markup language is changed, the generated web page is changed accordingly.

The system provides a complete solution for HTML layout, design, and Web site management. Designers have creative control and flexibility when designing Web sites. It lets graphic designers and publishers design and manage professional-quality Web sites containing the latest multimedia features, without requiring any HTML programming. At the same time, it provides HTML source-code and JavaScript tools to help Web designers and programmers integrate interactivity into their sites.

DESCRIPTION OF THE PREFERRED EMBODIMENTS

Figure 1:
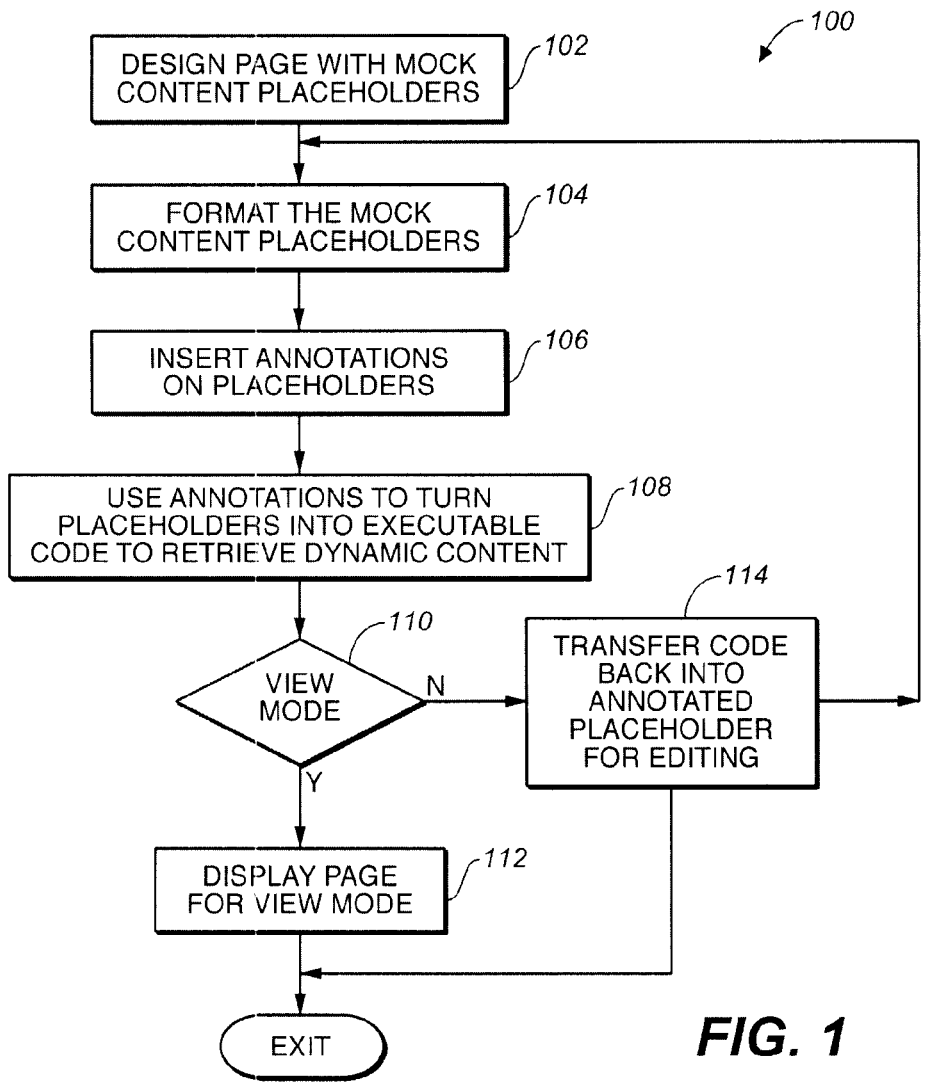
FIG. 1 is a flowchart illustrating a process for generating content using one or more mock placeholders.

Referring now to FIG. 1, a process 100 for editing and running pages with content is shown. In applying the process 100, a designer creates pages as usual, placing mock elements or placeholders on the page in place of actual content. The mock content lets the designer visually design the page exactly the way it should appear to the designer. After designing the page in this way, the designer binds or links the placeholders to fields in an online database, or a server such as an e-commerce server that provides data. The content of those fields replaces the mock content on the page when it appears live or is previewed.

Specifically, the designer layouts a page with mock content placeholders (step 102). Next, the designer formats the mock content placeholders as necessary (step 104). The designer can format placeholders the same way he can format non-placeholders. This includes setting font and style attributes for text; height and width for images; borders, height, width, and cell spacing for tables; and others. Steps 102 and 104 can be done using any HTML authoring tool, including GoLive, available from Adobe Systems Incorporated of San Jose, Calif.

The designer then associates one or more annotations with the placeholders (step 106). In one implementation, the designer selects a table from a database and then binds individual fields from that table to placeholders on the page. These annotations tell the system what database tables the page needs to access. An image, for example, may have an annotation that tells the process 100 to replace the source of the image with the content of a particular database field. In another example, a piece of text may have an annotation that tells the process 100 to replace the text with the content of another database field. When the page is saved as a file, the annotations are turned into code that will get the appropriate data and make it available to the page during display.

Annotations can be inserted manually or automatically. Pseudo-code for one annotation embodiment is as follows:
1. Find the tag that corresponds to the selected object.
2. Find the attribute list for the tag
3. Compute the annotations needed to describe the behavior of the selected object.
4. Add the annotations as attributes to the attribute list, replacing old attributes that have the same name with the new ones.

From step 106, the annotations are used to compile the placeholders into executable code to retrieve content (step 108). This is done when the page is saved as a file.

Next, in step 110, the process 100 determines whether the user is in edit mode or view mode. If the user is in the view mode, the process 100 proceeds to step 112 where the page is displayed. In this step, each placeholder is analyzed, and based on the type and the annotations of the placeholder, appropriate code is generated that will put in the actual content. Alternatively, the annotations can be interpreted to fill the page with content. At run-time or edit-time, the information in the annotations is processed to replace the placeholders with the actual content (interpretation). Finally, the page can be rendered with the content.

From step 110, if the user is in the edit mode, when the page is read, the code is decompiled back to the original placeholders and annotations so that the designer can edit them and change the layout (step 114). From step 112 or 114, the process 100 exits.

Figure 2A:
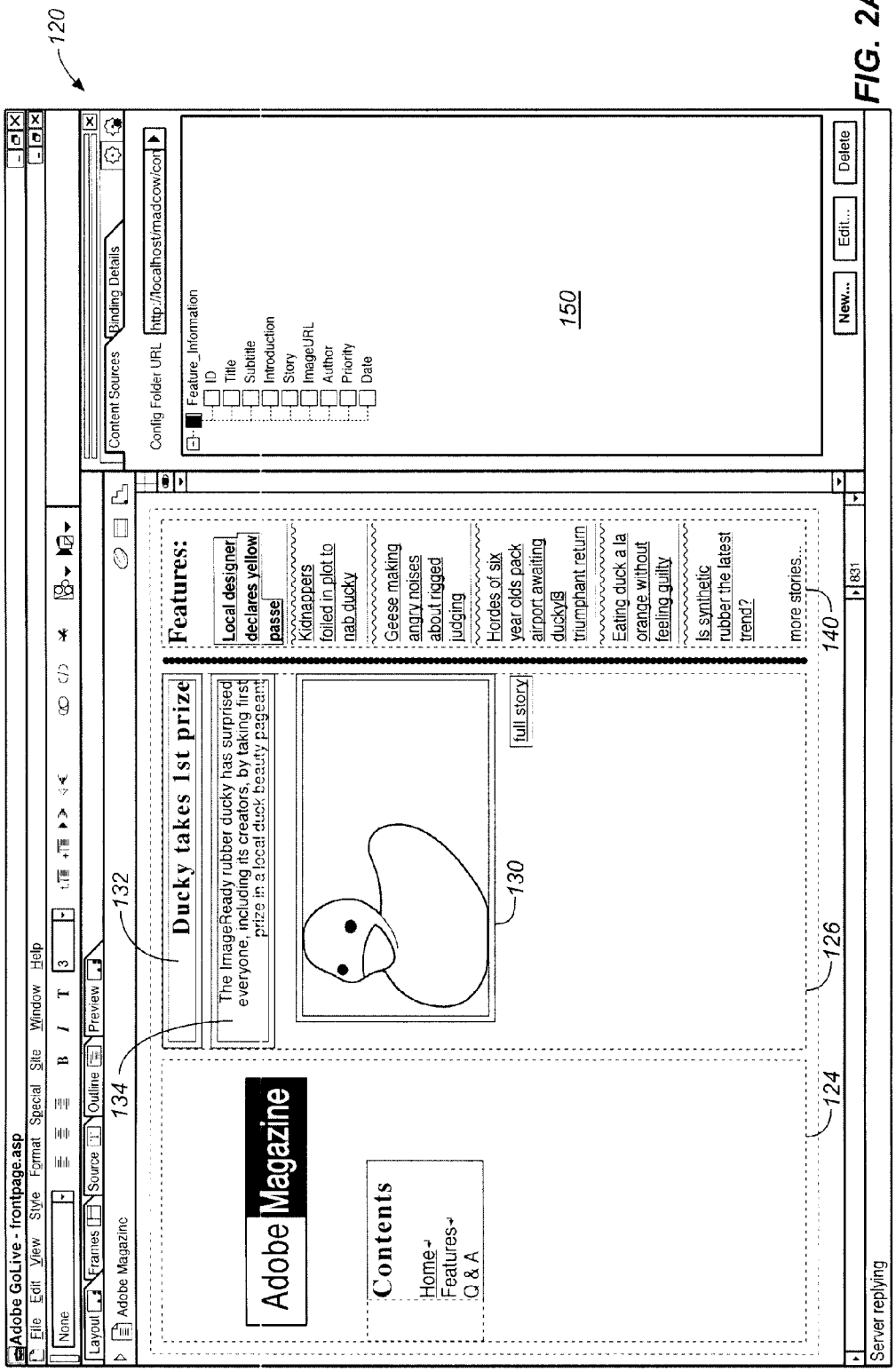
FIG. 2A is an exemplary user interface illustrating one or more mock placeholders and their content sources.

FIG. 2A shows an exemplary layout using an HTML editor such as Adobe's GoLive. GoLive provides a context-sensitive palette called the Inspector can be used to let the designer quickly customize objects without using commands in the menu bar. The context-sensitive Inspector can be used to set the attributes of text or objects in the page or site window. Inspectors are the source of point-and-shoot linking; they also let the designer reference image files or other resources, resize elements with pixel-level precision, align objects with respect to adjacent text, control object spacing between objects, and make many tag-specific settings.

The layout 120 of FIG. 2A has a background table, which in turn includes table cells 124, 126, and 140. The table cell 124 contains various elements such as of an "Adobe Magazine" icon and a "Contents" table. The table cell 126 contains text fields "Ducky takes 1$^{st}$ prize" and "The ImageReady rubber ducky has surprised everyone, including its creators, by taking first prize in a local duck beauty pageant." The table cell 126 also includes an image 130 to make the Web page more visually appealing. Finally, the table cell 140 includes a plurality of hotlinks to various featured articles.

FIG. 2A also shows a plurality of panes, including a binding details pane and a content sources pane 150. Once the designer adds a content source, the pane 150 allows the user to bind placeholders to specific fields in the online database that serves as the content source. The designer can select the placeholder and then select the field desired in the content sources pane 150 to bind the two. The designer can also enter or edit the paths in the URL to a "Config Folder" from this pane. These paths let the system find and use various files it needs for content, including the designer's databases.

When the designer selects on a particular element, one or more corresponding fields becomes highlighted and checked in the content sources pane 150 of the contents palette. When a table is bound to a content source and the contents of a row to a field within that content source, the page when previewed or viewed online places the contents of that field for each database record into each subsequent row of the table. The text in previous rows without bindings remains as headings. For example, if there are eight table rows, the contents of that database field for eight records will appear one after another, one record for each row.

In FIG. 2A, if the rubber duck image 130 is selected, the ImageURL field becomes highlighted and checked in the content sources pane of the Dynamic Content palette. This tells the designer that the currently selected placeholder is linked or bound to a field called ImageURL in the online database. The contents of that database field will replace the placeholder when the user previews the page or views it online. In this example, the database will insert a URL to a graphic element.

Operations associated with an exemplary placeholder are discussed next. In FIG. 2A, the image placeholder 130 can be added by putting an image placeholder on the page and then linking the placeholder to an image file. The image placeholder can then appropriately positioned on the page.

Similarly, to insert a text element with a title and a body, two text placeholders 132 and 134 on the page are created. The box next to a Title field listed in the content sources pane 150 is selected to bind the placeholder 132 to the Title field of the database. Next, the body placeholder 134 is selected, and the box next to the Introduction field in the Content Sources pane 150 is selected to bind the placeholder 134 to another field in the database. Finally, the Show Bindings button in the Dynamic Content palette is selected. At this point, the page can be previewed to see the content in action.

Specific portions of the HTML code for the sample page shown in FIG. 2A is shown below:

```
<!-- #INCLUDE FILE=". . ./config/include/utils.asp" -->
<!-- #INCLUDE FILE=". . ./config/include/ado.asp" -->
<!DOCTYPE html PUBLIC "-//W3C/DTD HTML 4.0 Transitional/EN">
<html>
    <head>
        <meta http-equiv="content-type" content="text/html;charset=iso-8859-1">
        <meta name="generator" content="Adobe GoLive 4">
        <title>Adobe Magazine</title>
        <%'Dynamic Link
        set Feature_InformationRecordSet = CreateObject("ADODB.RecordSet")
        Feature_InformationRecordSet.Open "select * from features order by Priority", ConnectString("Magazine")
        set Feature_Information = WrapRecordSet(Feature_InformationRecordSet)
        %>
```

-continued

```
    </head>
    <body bgcolor="white">
        <table border="0" cellpadding="0" cellspacing="10">
            <tr height="500">
                <td valign="top" height="500">
                    <h2><img src="images/logo.gif" width="226" height="155"></h2>
                    <h2>
                    <table border="0" cellpadding="0" cellspacing="0" width="145">
                        <tr>
                            <td width="33"></td>
                            <td>
                                <h2>Contents</h2>
                                <p><a href:="frontpage.asp">Home</a><br>
                                Features<br>
                                Q & A</td>
                            </tr>
                    </table>
                    </h2>
                </td>
                <td valign="top" align="right" height="500">
                    <h2><%=Feature_Information.Value("Title")%></h2>
                    <p><%=Feature_Information.Value("Introduction")%></p>
                    <p><img src='<%=Feature_Information.Value("ImageURL")%>' width="280" height="170"></p>
                    <p><a
href="fullarticle.asp?RECORD_KEY=$queryString&<%=Feature_Information.Key( )%>">
full story</a></td>
                <td width="1" valign="top" bgcolor="black" height="500"><img
src="images/spacer.gif" width="1" height="1"></td>
                <td valign="top" height="500">
                    <h2>Features</h2>
                    <p>
                    <table>
                        <% Feature_Information.MoveFirst %>
                        <% Feature_Information.Move 2 - 1 %>
                        <% while not Feature_Information.EOF %>
                        <tr>
                            <td><a
href="fullarticle.asp?RECORD_KEY=$queryString&<%=Feature_Information.Key( )%>"><
%=Feature_Information.Value("Title")%></a>
                                <hr>
                            </td>
                        </tr>
                        <% Feature_Information.MoveNext %>
                        <% wend %>
                    </table>
                    </p>
                    <p>more stories. . .</td>
                </tr>
        </table>
    </body>
</html>
<% if 0 then %>
<!--Mock Content
    Feature_Information:<TABLE> {<tr> <td><a href="fullarticle.asp">Kidnappers foiled in
plot to nab ducky    <hr> </a></td>    </tr>    <tr>    <td><a href="fullarticle.asp">Geese
making angry noises about rigged judging    <hr> </a></td>    </tr>    <tr>    <td><a
href="fullarticle.asp">Hordes of six year olds pack airport awaiting ducky's triumphant
return    <hr> </a></td> </tr> <tr> <td><a href="fullarticle.asp">Eating duck a la
orange without feeling guilty <hr> </a></td> </tr> <tr> <td><a
href="fullarticle.asp">Is synthetic rubber the latest trend?</a>    <hr> </td> </tr> }
    Feature_Information:Title {Ducky takes 1st prize}
    Feature_Information:Introduction {The ImageReady rubber ducky has surprised everyone,
including its creators, by taking first prize in a local duck beauty pageant}
    Feature_Information:Title {Local designer declares yellow passe}
    Feature_Information:ImageURL {images/ducky(big).jpg}
-->
<% end if %>
```

As shown above, the design for the page whose contents are changed on the fly to suit certain user qualifier or parameters can be created using existing HTML elements. An element can be tagged (using an attribute, among others) to be associated with some form of content. At run-time, the representative content is examined to format, style, and layout the content. When editing, the <--Mock Content . . . > tag enables the system to replace the content with the mock placeholders so that the page can be easily edited.

Figure 2B:
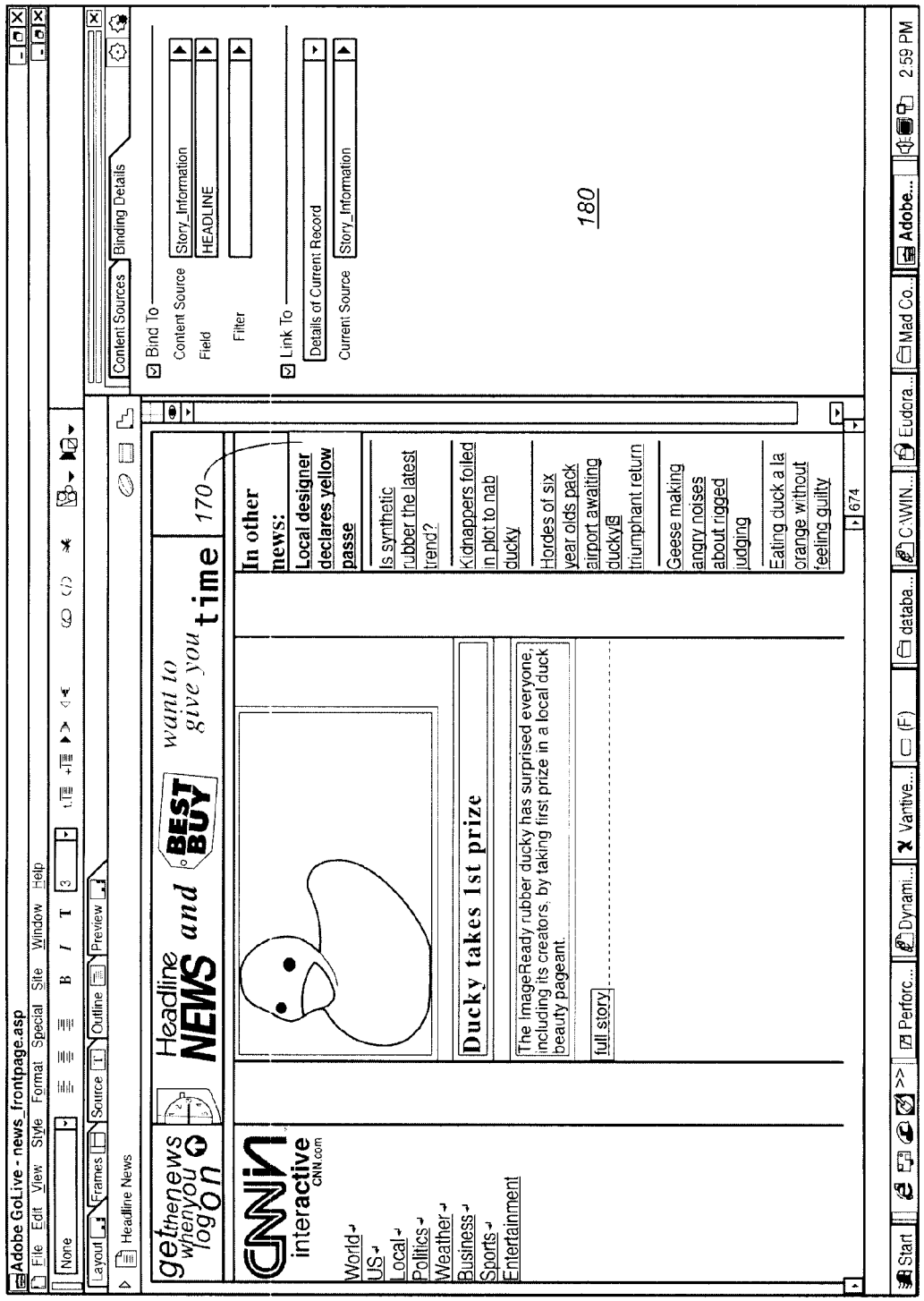
FIG. 2B is an exemplary user interface illustrating one or more mock placeholders and binding details associated with the placeholders.

FIG. 2B shows an exemplary user interface 180 illustrating one or more mock placeholders and binding details associated with the placeholders. The binding details are aggregated in a binding details pane 180. The "Bind To" area of the Binding Details pane is available whenever any placeholder is selected. The "Filter" area appears for text placeholders only. The "Link To" area appears only when an placeholder link is selected on the Web page. The "Binding Details" tab opens a pane in the palette where a designer can fine-tune bindings by selecting additional options that appear there. These options vary depending on the type of field involved in the binding, but can include: applying text formatting filters to format content such as currency and dates; linking to other pages; and creating "Previous" or "Next" buttons to navigate between records.

Figure 3:
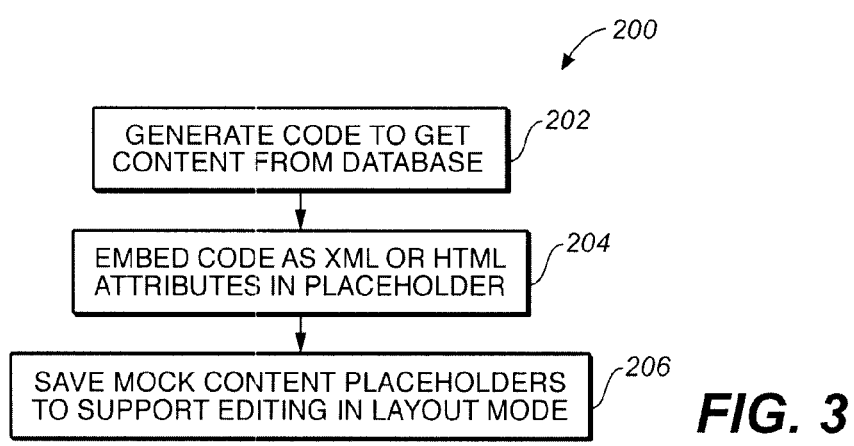
FIG. 3 is a flowchart of a process for processing the mock placeholders.

Referring to FIG. 3, a process 200 is shown for using placeholders for generating either viewable content or layout. First, the process 200 generates code to get contents from a database (step 202). In one embodiment, code to get information from a database is as follows:

```
<%
    set Story_InformationRS= CreateObject("ADODB.RecordSet")
    Story_InformationRS.Open "select * from features",
    ConnectString("Magazine")
    set Story_Information= WrapRecordSet(Story_InformationRS)
    Story_Information.Move Request.QueryString
    ("RECORD_INDEX") - 1
%>
```

Next, this code is embedded as HTML or XML attributes on the placeholder (step 204) or simply stored as an HTML element or an XML element. XML is a simplified dialect of SGML (Standard Generalized Markup Language) or the structured presentation of information on the World Wide Web. XML is a subset of SGML for defining custom markup languages. XML documents use Document Type Definitions (DTDs) that define the custom tags available for use in the document. More information on XML is provided at www.w3.org/XML/ or at www.xml.com/

Finally, the process 200 also saves mock content placeholders so that, it should be used as decide to edit the page in a edit mode, the mock content placeholders can be restored for the designer to edit.

Although the process 200 shows content generation from the point of a designer, a user can influence the generation of content as well. In another embodiment, the user can control the type of content that the web page is to display. The user can specify his or her desired content using a qualifier along with the entry of a web site address. For example, the user can search for all stories by a particular author by entering "www.publisher.comauthor=Tran." The returned web page would be customized to the user's qualifier and would return only contents that had been authored by the desired user qualifier. The code generated for a link of this example is shown below:

```
<%'Dynamic Link set Story_InformationRecordSet =
CreateObject("ADODB.RecordSet")
    Story_InformationRecordSet.Open "select * from Features where
    Author = "'& Request.QueryString("Author") & "' order
    by Priority",
ConnectString("Magazine")
    set Story_Information = WrapRecordSet(Story_Information
    RecordSet)
%>
```

To illustrate with an example, a placeholder element with annotations typically is expressed in HTML as:

```
<IMG src="ducky.jpg" dynamic_src="Story_Information:ImageURL">
```

The IMG tag additionally has an attribute called dynamic_src, which represents an annotation, which allows the system of FIG. 1 to turn the mock placeholder into content during a "live" rendering of the page. In addition, in edit mode, an editor such as Adobe GoLive can still show the IMG tag as a regular image of a duck.

In one embodiment, code to generate an image is:

```
<%
    [code to get content from the database]
%>
...
<IMG src="<%=Story_Information.Value("ImageURL")%>">
...
<!-- Mock Content Story_Information:ImageURL {ducky.jpg} -->
```

The last section lets the system reverse the compilation process for generating pages and turn the code back into an HTML page that the designer can edit the page as necessary.

Figure 4:
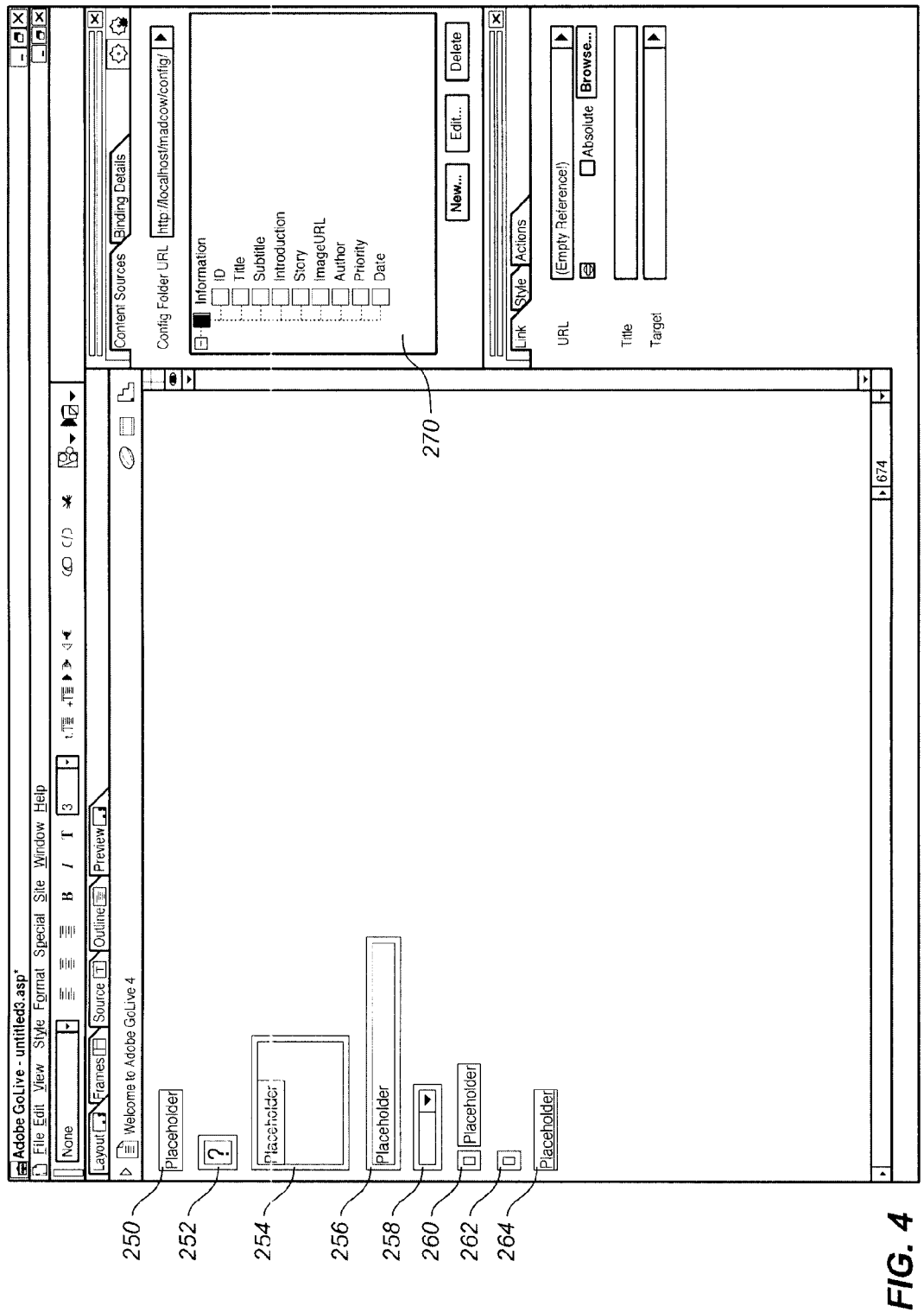
FIG. 4 is an exemplary user interface illustrating various exemplary mock placeholders and their content sources.

The invention operates with various other placeholder types. For instance, the page layout of FIG. 4 has a text placeholder 250, an image placeholder 252, a table placeholder 254, a text input box placeholder 256, a pull-down menu placeholder 258, a radio box placeholder 260, a checkbox placeholder 262 and a hotlink placeholder 264. A content source tab 270 is in turn associated with each of the placeholders 250–264.

Exemplary code for the text placeholder 250 is as follows:

```
<%=Product_Info.Value("Name")%>
```

This code inserts the text of the "Name" field from the current record of the "Product_Info" table. The current record is set by the code that retrieves the database information. The formatting depends on the tags surrounding the code. If the code is within an <H1> tag, for example, it is formatted as a heading.

Exemplary code for the image placeholder 252 is as follows:

```
<img height="32" width="32" src='<%=Information.Value
("ImageURL")%>'
```

This code replaces the src attribute of the image with the text of the ImageURL field. Replacing the src attribute causes the user's browser to retrieve the image referenced by the ImageURL.

Exemplary code for the table placeholder 254 is as follows:

```
<table border="4" cellpadding="0" cellspacing="2" width="119">
<% Product_Info.MoveFirst %>
<% while not Product_Info.EOF %>
<tr>
<td><%=Product_Info.Value("Title")%></td>
</tr>
```

-continued

```
<% Product_Info.MoveNext %>
<% wend %>
</table>
```

This code constructs a table that shows all the records in the Product_Info table, with one record per row. Each row will display the Name of one product. The table will have the formatting indicated by the attributes in the <TABLE> tag.

Exemplary code for the text input box placeholder 256 is as follows:

```
<input type="text" value='<%=Product_Info.Value("Name")%>'
name="Title" size="24">
```

This code creates a text input box for updating the Name field of the current record. The information will be uploaded to the database as part of a form submission.

Exemplary code for the pull-down menu placeholder 258 is as follows:

```
<select name="Title" size="1">
<% Shipping_Methods.MoveFirst %>
<% while not Shipping_Methods.EOF %>
<option value='<%=Shipping_Methods.Value
("MethodName")%>'name="ShippingMethod"
<%=selected(Product_Info.Value("ShippingMethod")
Shipping_Methods.Value("MethodName"))%>><%=
Shipping_Methods.Value
("MethodName")%>
<% Shipping_Methods.MoveNext %>
<% wend %>
</select>
```

This code constructs a pull down menu to update the ShippingMethod field of the current record. The entries in the menu are created from the records in the Shipping_Methods table, each of which has a MethodName. The code is further designed to show the shipping method assigned to the current record.

Exemplary code for the radio box placeholder 260 is as follows:

```
<input type="radio" value='<%=Information.Value("Subtitle")%>'
name="Title"<%=checked(Information.Value("Title")
Information.Value("Subtitle"))%>><%=Information.Value
("Title")%>
<table border="0" cellpadding="2" cellspacing="2">
<% Status_List.MoveFirst %>
<% while not Status_List.EOF %>
<tr>
<td><input type="radio" value='<%=Status_List.Value
("ProjectStatus")%>'
name="ProjectStatus"<%=checked(Project_Information.Value
("ProjectStatus")
Status_List.Value("ProjectStatus"))%>><%=Status_List.Value
("ProjectStatus")%>
</td>
</tr>
<% Status_List.MoveNext %>
<% wend %>
</table>
```

This code fills the rows of a table with radio buttons to set the ProjectStatus field of the current Record. The code is similar to the pulldown menu code: entries are constructed from one table in the database (Status_List), and the current value is taken from another table (the current record selected in the Project_Information table). This code would typically be part of a form that the user could use to update the status of a project.

Exemplary code for the checkbox placeholder 262 is as follows:

```
<input type="checkbox" value="1" name="OnSale"
<%=checked(cint(Product_Info.Value("OnSale")) <> 0)%>><input type=
"hidden"
name="~OnSale" value="0">
```

This code creates a checkbox form control to update the value of the OnSale field of the current product. The extra code for the hidden input works around a limitation of HTML when updating Boolean fields in a database.

Exemplary code for the hotlink placeholder 264 is as follows:

```
<a href="product_details.asp?
RECORD_KEY=$queryString&<%=Product_Info.Key( )%>">
<%=Product_Info.Value("Name")%></a>
```

This code creates a hotlink to another page, product_details.asp that will show more information about the current product. The Product_Info.Key( ) code passes the key for the current product to the details page so that it knows which record to show.

The code in these examples uses ASP (Microsoft's Active Server Page technology), but it could equally well use any other server side scripting format, including Java Server Pages (JSP)., PHP, and Perl. The internal annotation format also supports conversion among different formats by converting one format into the internal annotation format and then outputting the data in a different format.

The design is created using existing HTML elements. An element can be tagged (using an attribute, among others) to be associated with some form of content. At run-time, the representative content is examined to format, style, and layout the content.

The annotations are stored as XML or HTML attributes. This has the advantage that the file stays an XML or an HTML file, so that the designer can continue to edit it using existing XML and HTML tools. In contrast, other output formats do not use this model. ASP code, for example, is unstructured and cannot typically be read into an HTML editor.

Using the attribute format makes it easy to apply an interpreter that processes the content at runtime. An interpreter is a computer program that translates and executes instructions written in an interpreted programming language, such as programs written in Perl, Basic, or Java. The translation process involves the conversion of each source language statement of a given computer program into machine language suitable for execution. A user wishing to execute an application program written in the programming language will invoke an interpreter in order to execute the application program. The interpreter can simply parse the page as an XML or HTML document, and then using the standard DOM interface for accessing such a document, it can find the content annotations, fetch the required content, and substitute for the placeholders.

Figure 5:
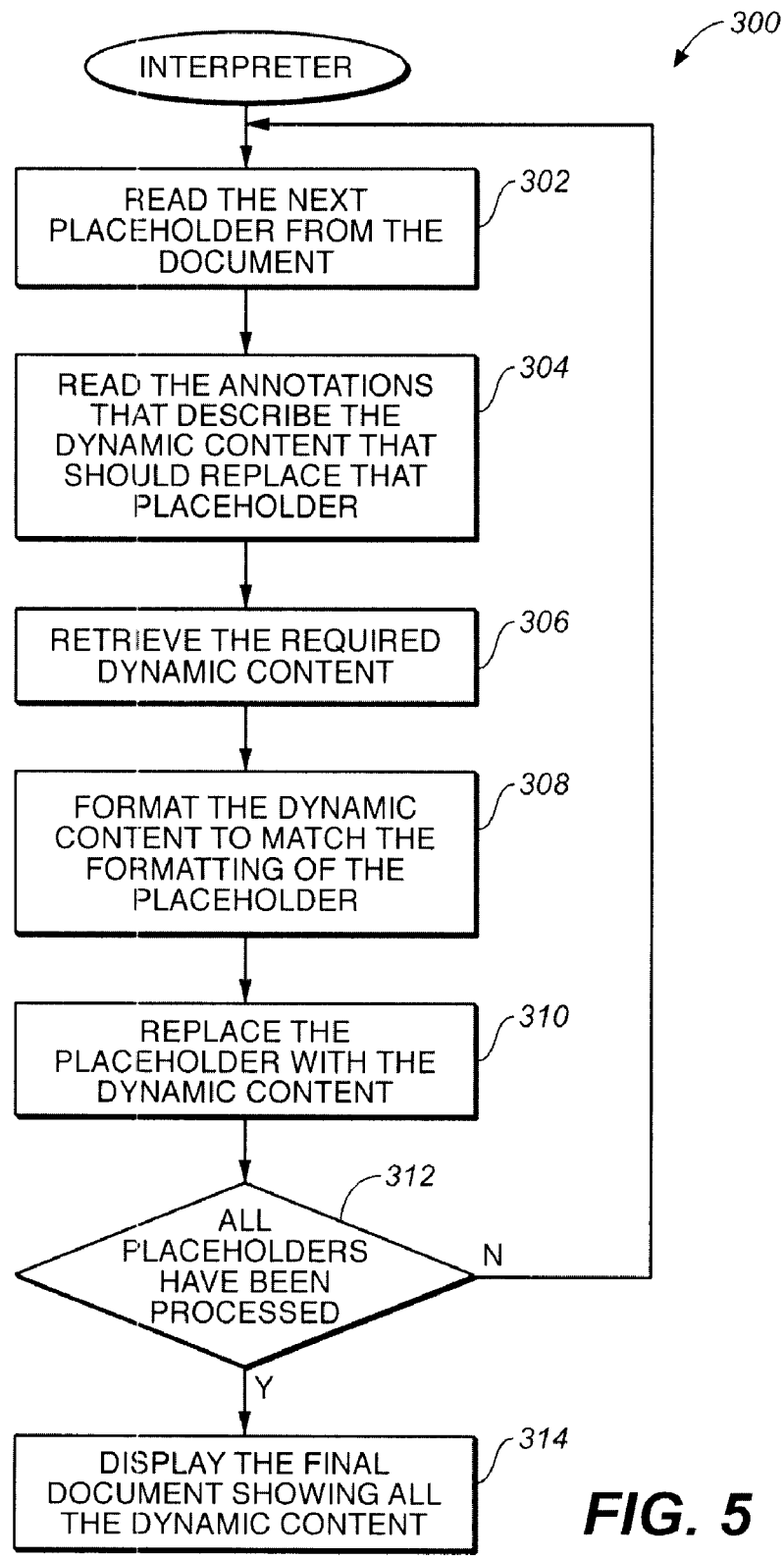
FIG. 5 is a flowchart of a process for interpreting the content associated with the mock placeholders.

Referring now to FIG. 5, a process 300 for interpreting the content is shown. First, the process 300 retrieves the next placeholder from the document (step 302). The process 300 then reads the annotations describing the content that should replace that placeholder (step 304). The required content is retrieved (step 306). The process 300 then formats the content to match the formatting of the placeholder (step 308) and replaces the placeholder with the content (step 310). Next, the process 300 checks whether all placeholders have been processed (step 312). If not, the process 300 loops back to step 402 to continue processing the placeholders. Alternatively, the process 300 proceeds from step 312 to display the final document showing all the content (step 314).

Pseudo-code to display a document by interpreting the content annotations is shown below:

1. Read the next placeholder from the document.
2. Read the annotations that describe the content that should replace that placeholder.
3. Retrieve the required content.
4. Format the content to match the formatting of the placeholder.
5. Replace the placeholder with the content.
6. Continue with step 1 until all placeholders have been processed.
7. Display the final document showing all the content.

Figure 6:
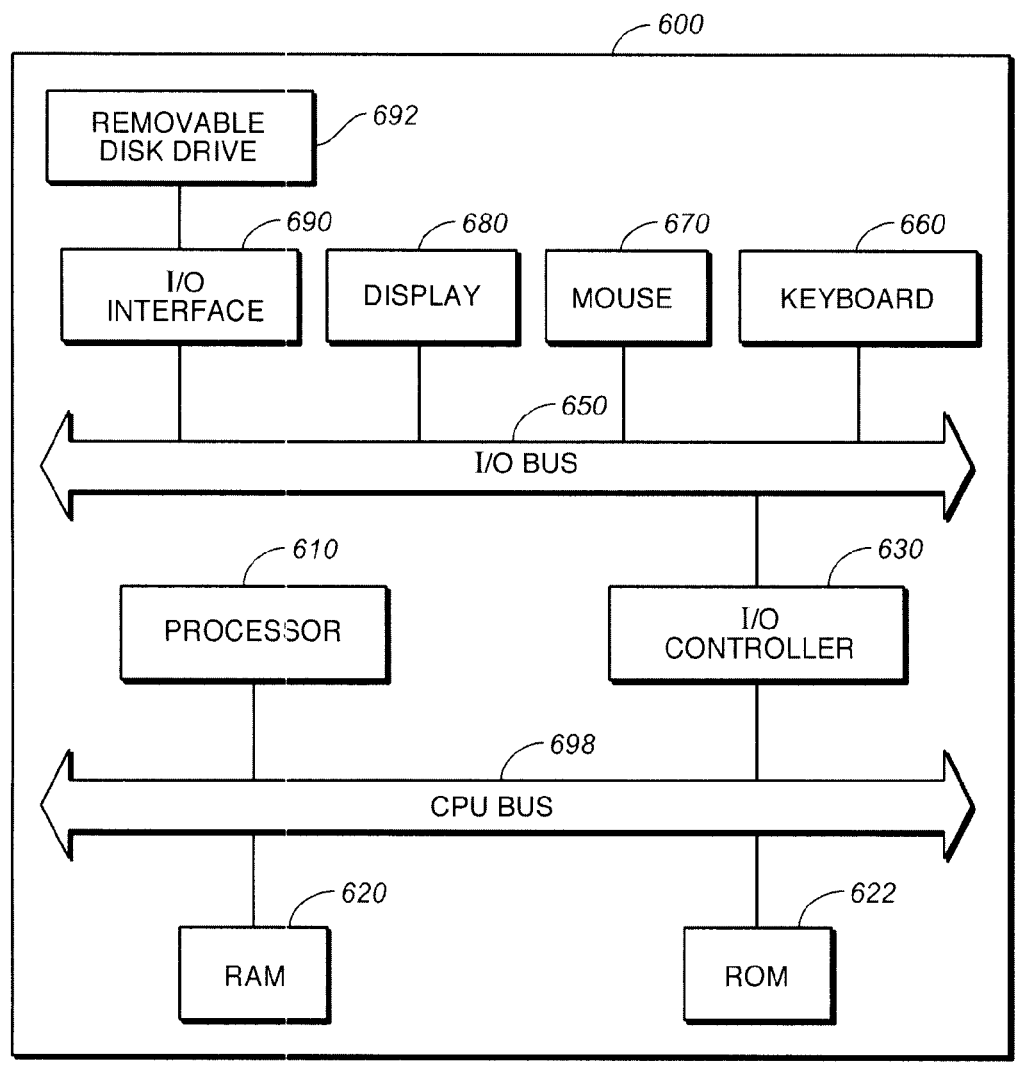
FIG. 6 is an exemplary computer system for executing the process of FIG. 1.

The invention may be implemented in digital hardware or computer software, or a combination of both. Preferably, the invention is implemented in a computer program executing in a computer system. Such a computer system may include a processor, a data storage system, at least one input device, and an output device. FIG. 6 illustrates one such computer system 600, including a processor (CPU) 610, a RAM 620, a ROM 622 and an I/O controller 630 coupled by a CPU bus 698. The I/O controller 630 is also coupled by an I/O bus 650 to input devices such as a keyboard 660, a mouse 670, and output devices such as a monitor 680. Additionally, one or more data storage devices 692 are connected to the I/O bus via an I/O interface 690.

Further, variations to the basic computer system of FIG. 5 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A method for generating a document, comprising:
    inserting one or more placeholders in the document, each placeholder having representative content, the representative content having associated formatting information;
    binding each placeholder to a content source; and
    presenting the placeholders, including presenting the representative content of the placeholders according to the associated formatting information, the representative content of a placeholder being replaceable in a presentation mode by content generated based on the content source bound to the placeholder, the generated content being presented in the presentation mode according to the formatting information associated with the corresponding representative content.

2. The method in claim 1, further comprising formatting the placeholders.

3. The method of claim 1, further comprising annotating the placeholders.

4. The method of claim 3, wherein executable code is generated from annotations, the method further comprising:
    executing the executable code to retrieve the content; and
    presenting the retrieved content.

5. The method of claim 1, wherein the placeholder is a mark-up element.

6. The method of claim 5, wherein the mark-up element is an HTML element.

7. The method of claim 5, wherein the mark-up element is an XML element

8. The method of claim 1, wherein inserting one or more placeholders includes:
    inserting one or more mark-up elements in the document.

9. The method of claim 8, further comprising updating a markup language document during run-time based on an original layout and content generated on-the-fly.

10. The method of claim 9, wherein the generated content replaces the placeholder.

11. The method of claim 1, further comprising:
    generating content for each placeholder based on the corresponding content source and, if in a presentation mode, presenting the generated content in place of the placeholder, the generated content being presented according to the formatting information associated with the corresponding representative content.

12. The method of claim 11, further comprising rendering the document based on the content.

13. The method of claim 11, wherein:
    generating content for each placeholder based on the corresponding content source includes interpreting the placeholders.

14. The method of claim 13, wherein each placeholder includes an annotation describing the content for the placeholder; and
    interpreting a placeholder includes reading the annotation that describes the content to replace the placeholder.

15. The method of claim 14, further comprising retrieving the content as interpreted by the annotations.

16. The method of claim 11, wherein presenting the content includes rendering the content for viewing.

17. The method of claim 11, further comprising storing metadata for the placeholder as a comment field in the document.

18. The method of claim 11, wherein generating content includes:
    compiling the placeholders into code to generate content for the document based on the content source; and
    executing the code to generate the content.

19. The method of claim 18, wherein compiling the placeholders further comprises compiling code to obtain content from a database.

20. The method of claim 18, further comprising embedding the code as attributes in the placeholder.

21. The method of claim 18, wherein presenting the generated content according to the formatting information associated with the representative content of a placeholder includes using formatting, styling, or layout of the representative content of the placeholder to format, style, or layout the generated content.

22. The method of claim 11, further comprising:
presenting the content in the presentation mode; and
in response to input specifying an edit mode, replacing the generated content with the representative content, and presenting the representative content according to the formatting information.

23. The method of claim 22, further comprising:
in the edit mode, modifying the associated formatting information for the placeholders and redisplaying the representative content of the placeholders according to the associated formatting information.

24. The method of claim 1, wherein the formatting information includes format information, styling information or layout information.

25. A computer program product tangibly embodied in a computer readable medium, the computer program product comprising instructions operable to cause data processing equipment to:
insert one or more placeholders in the document, each placeholder having a representative content, the representative content having associated formatting information;
bind each placeholder to a content source; and
present the placeholders, including presenting the representative content of the placeholders according to the associated formatting information, the representative content of a placeholder being replaceable in a presentation mode by content generated based on the content source bound to the placeholder, the generated content being presented in the presentation mode according to the formatting information associated with the corresponding representative content.

26. The computer program product of claim 25, wherein the instructions to insert one or more placeholders cause the data processing equipment to:
insert one or more mark-up elements in the document.

27. The computer program product of claim 25, further comprising instructions operable to cause the data processing equipment to:
in the edit mode, modify the associated formatting information for the placeholders and redisplay the representative content of the placeholders according to the associated formatting information.

28. The computer program product of claim 25, further comprising instructions operable to cause the data processing equipment to:
if in a presentation mode, generate content for each placeholder based on the corresponding content source and present the generated content in place of the placeholder, the generated content being presented according to the formatting information associated with the corresponding representative content.

29. The computer program product of claim 28, further comprising instructions operable to cause the data processing equipment to:
compile each placeholder into code to generate content for the document based on the content source;
wherein the instructions to generate the content include instructions to execute the code to generate the content.

30. The computer program product of claim 29, further comprising instructions operable to cause the data processing equipment to embed the code as attributes in the placeholder.

31. The computer program product of claim 28, further comprising instructions operable to cause the data processing equipment to:
present the generated content in the presentation mode; and
in response to input specifying a reversion to the edit mode, present the representative content according to the formatting information.

32. The computer program product of claim 31, wherein the instructions to generate content for each placeholder based on the corresponding content cause the data processing equipment to:
interpret the placeholders.

33. The computer program product of claim 28, wherein the instructions to present the generated content according to the formatting information associated with the representative content of a placeholder cause the data processing equipment to:
use formatting, styling, or layout of the representative content of the placeholder to format, style, or layout the content.

34. The computer program product of claim 28, wherein the instructions to present the generated content cause the data processing equipment to render the generated content for viewing.

35. The computer program product of claim 25, further comprising instructions operable to cause the data processing equipment to annotate the placeholders.

36. The computer program product of claim 35, further comprising instructions operable to cause the data processing equipment to generate executable code from the annotations to retrieve the generated content.

37. The computer program product of claim 25, further comprising instructions operable to cause the data processing equipment to render the page based on the generated content.

38. A system for generating a document, comprising:
a processor;
data storage device coupled to the processor;
means for inserting one or more placeholders in the document, each placeholder having representative content, the representative content having associated formatting information;
means for binding each placeholder to a content source;
means for compiling placeholders into code to generate content for the document based on the content source;
means for presenting the placeholders, including presenting the representative content of the placeholders according to the associated formatting information, the representative content of a placeholder being replaceable in a presentation mode by content generated based on the content source bound to the placeholder, the generated content being presented in the presentation mode according to the formatting information associated with the corresponding representative content.

39. The system of claim 38, further comprising:
means for executing code in a presentation mode to generate the content of the document; and
means for presenting the document using the generated content.

40. The system of claim 39, further comprising:
means for presenting the content in the presentation mode; and
means for presenting the representative content according to the formatting information in response to input specifying a reversion to the edit mode.

* * * * *

UNITED STATES PATENT AND TRADEMARK OFFICE
CERTIFICATE OF CORRECTION

| | | |
|---|---|---|
| PATENT NO. | : 7,194,680 B1 | Page 1 of 1 |
| APPLICATION NO. | : 09/456888 | |
| DATED | : March 20, 2007 | |
| INVENTOR(S) | : H. Scott Roy and Jeff Young | |

It is certified that error appears in the above-identified patent and that said Letters Patent is hereby corrected as shown below:

Column 14, line 10, (claim 2) replace the phrase "The method in claim 1" with --The method of claim 1--;

Column 14, line 28, (claim 9) replace the word "markup" with --mark-up--;

Signed and Sealed this

Fifth Day of June, 2007

JON W. DUDAS
*Director of the United States Patent and Trademark Office*